US012794164B2

(12) United States Patent
Gao et al.

(10) Patent No.: US 12,794,164 B2
(45) Date of Patent: Nov. 10, 2026

(54) CONNECTOR

(71) Applicants: Tyco Electronics (Suzhou) Ltd., Suzhou City (CN); Tyco Electronics (Shanghai) Co., Ltd., Shanghai (CN)

(72) Inventors: Limin Gao, Suzhou (CN); Feng (Charles) Wan, Shanghai (CN); Zhaowen Zhou, Shanghai (CN)

(73) Assignees: Tyco Electronics (Suzhou) Ltd., Suzhou City (CN); Tyco Electronics (Shanghai) Co., Ltd., Shanghai (CN)

( * ) Notice: Subject to any disclaimer, the term of this patent is extended or adjusted under 35 U.S.C. 154(b) by 425 days.

(21) Appl. No.: 18/485,605

(22) Filed: Oct. 12, 2023

(65) Prior Publication Data

US 2024/0136753 A1 Apr. 25, 2024

(30) Foreign Application Priority Data

Oct. 14, 2022 (CN) ......................... 202222719091.7

(51) Int. Cl.
*H01R 13/424* (2006.01)

(52) U.S. Cl.
CPC .................................. *H01R 13/424* (2013.01)

(58) Field of Classification Search
CPC .................................................... H01R 13/424
USPC ........................................................... 439/701
See application file for complete search history.

(56) References Cited

U.S. PATENT DOCUMENTS

| | | | | |
|---|---|---|---|---|
| 5,879,174 | A * | 3/1999 | Kountz | H01R 13/6588 439/141 |
| 6,422,881 | B1 * | 7/2002 | Puhl | H01R 13/4538 439/140 |
| 6,896,531 | B2 * | 5/2005 | Bakker | H01R 13/4538 439/157 |
| 7,090,533 | B1 * | 8/2006 | Houck | H01R 13/743 439/546 |
| 7,354,282 | B2 * | 4/2008 | Margulis | H01R 13/04 439/660 |
| 8,038,455 | B1 * | 10/2011 | Moraes | H01R 13/4538 439/140 |
| 10,148,031 | B2 * | 12/2018 | Tan | H01R 13/514 |
| 10,218,124 | B1 * | 2/2019 | Probert | H01R 13/62966 |
| 10,312,626 | B2 * | 6/2019 | Vasbinder | H01R 13/631 |
| 10,622,757 | B2 * | 4/2020 | Kawashima | H01R 13/62938 |
| 10,673,188 | B2 * | 6/2020 | Qiao | H01R 12/721 |
| 11,271,347 | B2 * | 3/2022 | Moll | H01R 13/506 |
| 11,355,885 | B2 * | 6/2022 | Sekino | H01R 13/506 |
| 11,381,026 | B1 * | 7/2022 | Probert | H01R 13/422 |
| 11,394,151 | B2 * | 7/2022 | Sundarakrishnamachari | H01R 13/424 |
| 2009/0311896 | A1 * | 12/2009 | Myer | H01R 13/4223 439/248 |
| 2014/0302724 | A1 * | 10/2014 | Ono | H01R 13/502 439/751 |
| 2022/0200204 | A1 * | 6/2022 | Hitchcock | H01R 27/02 |

* cited by examiner

*Primary Examiner* — Harshad C Patel
(74) *Attorney, Agent, or Firm* — Barley Snyder

(57) ABSTRACT

A connector includes a housing in which is provided at least one first terminal adapted to transmit a first current, at least one second terminal adapted to transmit a second current, and at least one third terminal adapted to transmit a signal. A total number of the at least one first terminal, the at least one second terminal, and the at least one third terminal is twenty-six.

20 Claims, 5 Drawing Sheets

CONNECTOR

CROSS-REFERENCE TO RELATED APPLICATION

This application claims the benefit of Chinese Patent Application No. 202222719091.7 filed on Oct. 14, 2022 in the China National Intellectual Property Administration, the whole disclosure of which is incorporated herein by reference.

FIELD OF THE INVENTION

Embodiments of the disclosure generally relate to a connector.

BACKGROUND

A connector is a device used to connect two elements to transmit current or signals therebetween. A connector may simplify an assembly process of electronic products, and thus their mass production. The utilization of connectors increase the ease of component repair or replacement, as faulty electronic component may be quickly replaced with a connector installed. With the advancement of technology, electronic products equipped with connectors may update electronic components, replacing old electronic components with new and better performing ones for easy upgrading. A connector may enhance the flexibility of product design when designing and integrating new products, as well as when composing a system with electronic components. Therefore, connectors are widely used in fields such as transportation, healthcare, aerospace, military, and home appliances.

The basic performance of a connector may be divided into three categories: mechanical performance, electrical performance, and environmental performance. Plugging force and mechanical life are important mechanical performances. The plugging force and mechanical life of a connector are related to a structure (positive pressure) of an element contacting with the connector, a coating quality of a contact area (sliding friction coefficient), and a size accuracy of a contact arrangement (alignment). Main electrical performances of a connector comprise a contact resistance, an insulation resistance, and a dielectric strength. Among them, a high-quality electrical connector should have a low and stable contact resistance, which ranges from a few milliohms to tens of milliohms. An insulation resistance is an index that indicates an insulation performance between contacts of an electrical connector and between the contacts and a housing of the electrical connector. An order of magnitude of the insulation resistance ranges from hundreds of megaohms to thousands of megaohms. Dielectric strength is an ability of the electrical connector to withstand a rated test voltage between the contacts of the electrical connector or between the contacts and the housing of the electrical connector. Environmental performance includes temperature resistance, humidity resistance, salt spray resistance, vibration and impact resistance, etc.

In recent years, in applications of large-scale integrated devices and equipment, it is necessary to transmit multiple different signals at a high power between various components simultaneously. Accordingly, a connector must be equipped with more terminals to meet a growing performance needs for devices and equipment. This poses new challenges for a design of the connector.

SUMMARY

According to an embodiment of the present disclosure, a connector includes a housing in which is provided at least one first terminal adapted to transmit a first current, at least one second terminal adapted to transmit a second current, and at least one third terminal adapted to transmit a signal. A total number of the at least one first terminal, the at least one second terminal, and the at least one third terminal is twenty-six.

BRIEF DESCRIPTION OF THE DRAWINGS

The invention will now be described by way of example with reference to the accompanying Figures, of which.

DETAILED DESCRIPTION OF THE EMBODIMENTS

Figure 1:
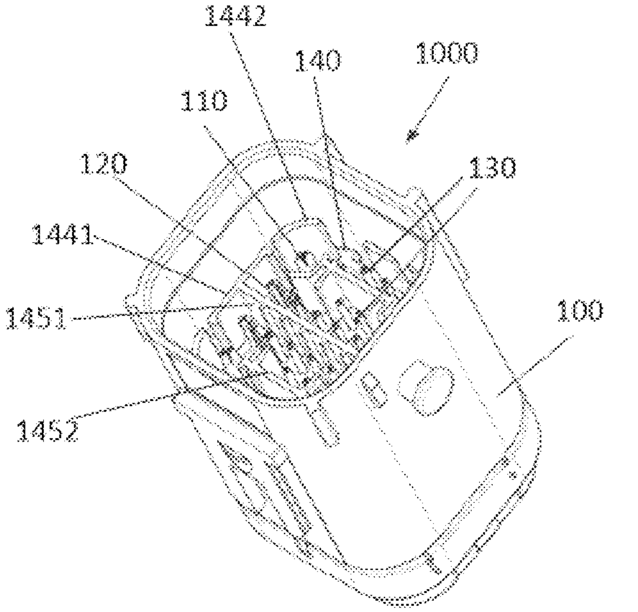
FIG. 1 is a perspective view of a connector according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring to FIGS. 1-9, a connector 1000 is disclosed which includes a housing 100, at least one first terminal 110, at least one second terminal 120, and at least one third terminal 130 arranged in the housing 100. The first terminal 110 is configured to transmit a first current, the second terminal 120 is configured to transmit a second current, and the third terminal 130 is configured to transmit a signal. Among them, a total number of the first terminal 110, the second terminal 120, and the third terminal 130 is twenty-six (26), so the connector 1000 according to the embodiments of this disclosure is also referred to as a "26 terminal hybrid connector".

Projections of the first terminal 110, the second terminal 120, and the third terminal 130 in a cross section of the housing are arranged to minimize a diameter of a circumcircle C1 of the cross section. For clarity, the circumcircle C1 is only shown in FIG. 3 in a dashed line. The minimization of the diameter of the circumcircle C1 allows the housing 100 of connector 1000 to be minimized while accommodating 26 terminals, which facilitates integrating as many connectors 1000 as possible on the same and one mounting plate so as to meet performance needs of large-scale devices (such as high power and high current devices).

Figure 2:
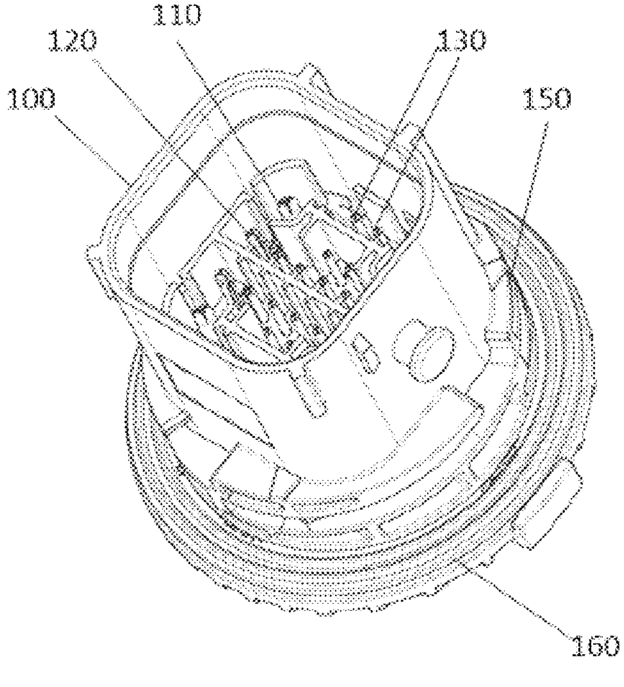
FIG. 2 is a perspective view of the connector shown in FIG. 1 provided with a mounting member and a seal.
Figure 5:
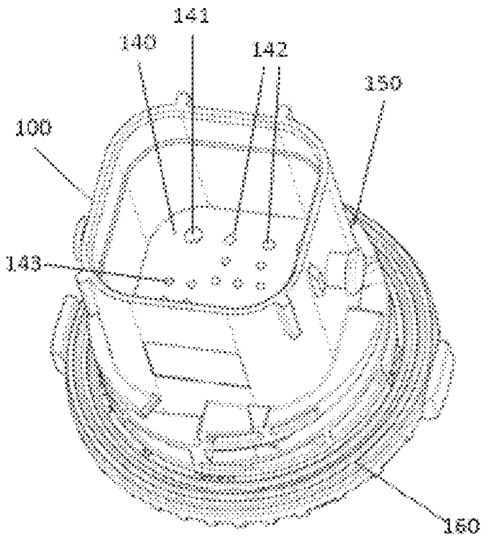
FIG. 5 is a perspective view of the connector shown in FIG. 4 provided with a mounting member and a seal.
Figure 8:
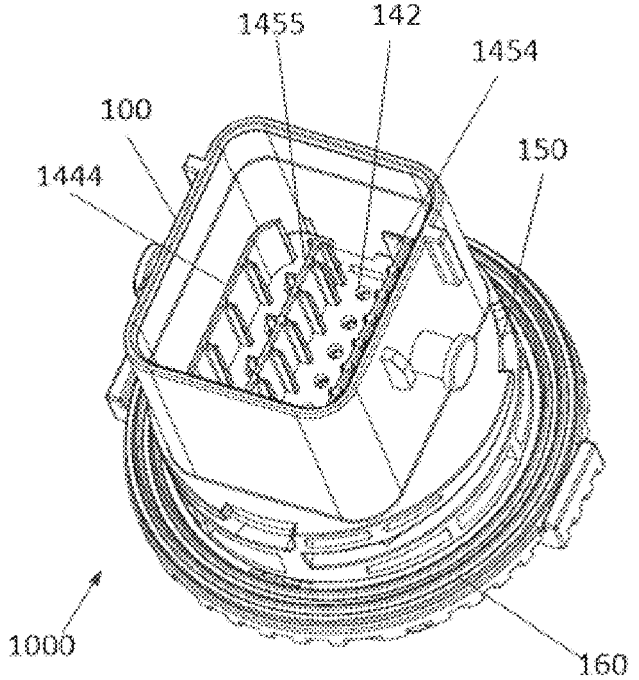
FIG. 8 is a perspective view of the connector shown in FIG. 7 provided with a mounting member and a seal.

Referring to FIGS. 2, 5 and 8, the connector 1000 also comprises a mounting member 150 and a seal 160. The mounting member 150 is arranged on an outside of the housing 100 in a circumferential direction of the housing 100 so as to mount the connector 1000 into a mounting plate of a specific device. In this way, a plurality of the connectors 1000 may be integrated onto a single mounting plate. The seal 160 is disposed on the mounting member 150 to form a sealed connection between the connector 1000 and the mounting plate, preventing contamination or fluid from entering between the connector 1000 and the mounting plate and causing connector 1000 to malfunction.

Figure 3:
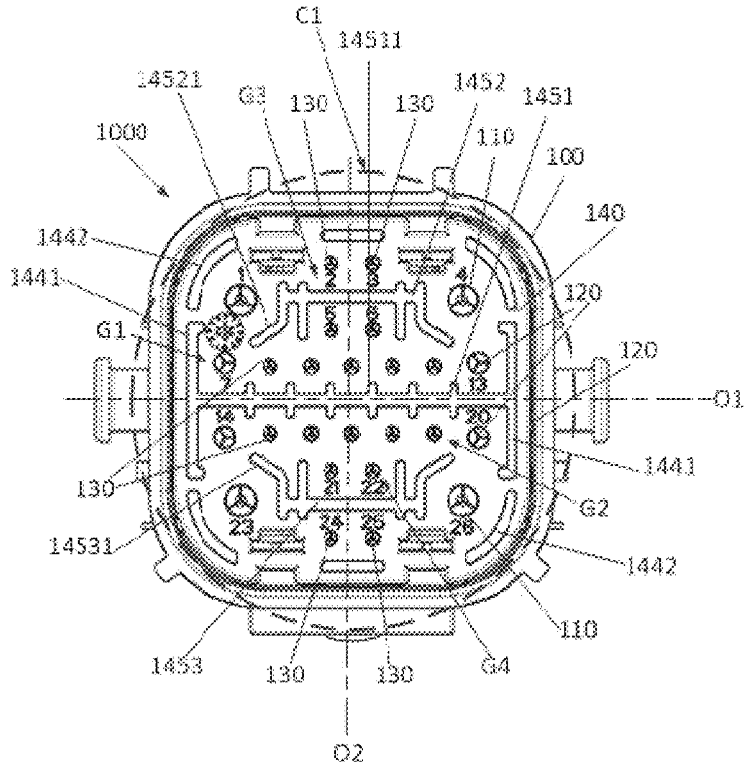
FIG. 3 is a top view showing a layout of the terminals of the connector shown in FIG. 1.
Figure 6:
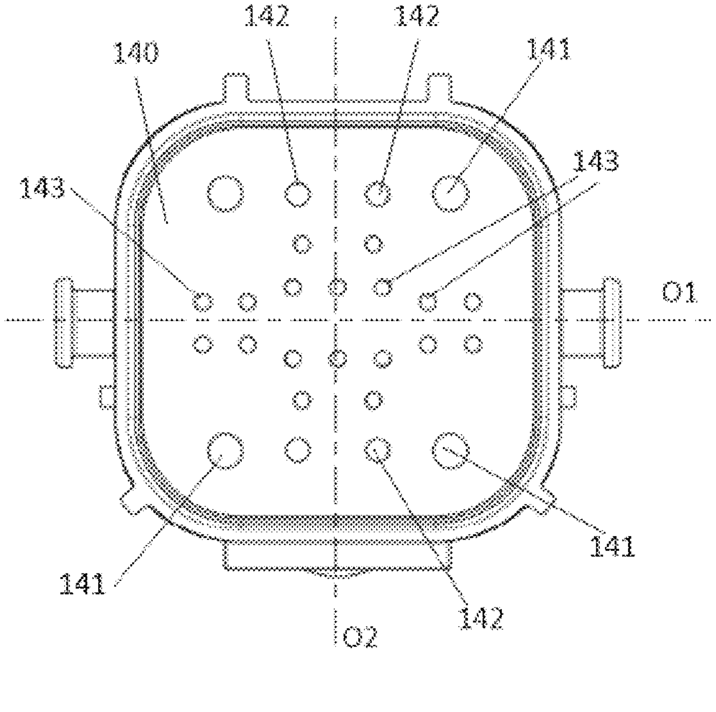
FIG. 6 is a top view showing a layout of the terminals of the connector shown in FIG. 4.
Figure 9:
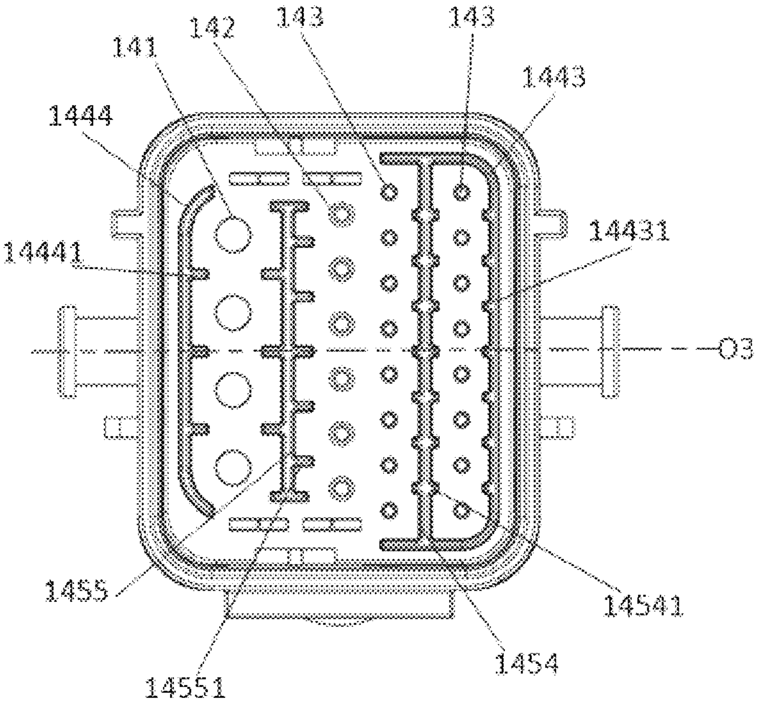
FIG. 9 is a top view showing a layout of the terminals of the connector shown in FIG. 7.

Referring to FIGS. 3, 6 and 9, the connector 1000 also comprises a positioning plate 140 mounted into the housing 100 in such a way that it coincides with the cross section. The positioning plate 140 is provided with a first hole 141 through which the first terminal 110 is configured to extend, a second hole 142 through which the second terminal 120 is configured to extend, and a third hole 143 through which the third terminal 130 is configured to extend. Among them, the first hole 141, the second hole 142, and the third hole 143 are arranged to be in one-to-one correspondence with the first terminal 110, second terminal 120, and third terminal 130 respectively, and distributions of the first hole 141, the second hole 142, and the third hole 143 on the positioning plate 140 is configured to minimize the diameter of the circumcircle C1 of the cross section or positioning plate 140.

The distributions of the first hole 141, the second hole 142, and the third hole 143 on the positioning plate 140 determine and represent the distributions of the first terminal 110, the second terminal 120, and the third terminal 130 on the positioning plate 140. For the convenience of description and clarity of view, the following only describes the distributions of the first hole 141, the second hole 142, and the third hole 143 on the positioning plate 140. Those skilled in the art knows that this is equivalent to the distributions of the first terminal 110, the second terminal 120, and the third terminal 130 on the positioning plate 140.

Referring to FIGS. 1-3 and 7-9, guards 1441, 1442, 1443, 1444, and partitions 1451, 1452, 1453, 1454, 1455 are provided on the positioning plate 140. The guards 1441, 1442, 1443, 1444 are configured to protrude from the positioning plate 140 and extend in a circumferential direction of the positioning plate 140 so as to surround the first hole 141, the second hole 142, and the third hole 143 therein respectively, preventing users from unintentionally touching or other objects from colliding with the first terminal 110, the second terminal 120, and the third terminal 130 extending therethrough. The partitions 1451, 1452, 1453, 1454, 1455 are configured to protrude from the positioning plate 140 and extend between at least two holes of the first hole 141, the second hole 142, and the third hole 143. This not only prevents users from accidentally touching or other objects from colliding with the first terminal 110, the second terminal 120, and the third terminal 130 extending therethrough, but also ensures electrical insulation between the first terminal 110, second terminal 120, and third terminal 130. Furthermore, in order to enhance separation functions of the guards 1441, 1442, 1443, 1444 and the partitions 1451, 1452, 1453, 1454, 1455, at least one of the guards 1441, 1442, 1443, 1444 and the partitions 1451, 1452, 1453, 1454, 1455 is provided with at least one protrusion 14431, 14441, 14511, 14551, 14541 configured to protrude between adjacent two ones of the holes, so as to protect the first terminal 110, the second terminal 120 and the third terminal 130 free from collision and further ensure electrical insulation between the terminals.

Referring to the embodiments of FIGS. 1-3, the positioning plate 140 is configured as a square, and the first hole 141, second hole 142, and third hole 143, the guards 1441, 1442, and the partitions 1451, 1452, and 1453, are arranged so that they are symmetrically distributed about a first symmetry axis O1 extending through one pair of two opposite sides of the square and a second symmetry axis O2 extending through another pair of two opposite sides of the square, respectively. Four first holes 141 are respectively arranged near four corners of the square. Ten third holes 143 and four second holes 142 are arranged as two sets of holes G1, G2 arranged along a straight line parallel to the first symmetry axis O1, respectively. The two sets of holes G1, G2 are symmetrical about the first symmetry axis O1, respectively. As shown in FIG. 3, two sets of holes G1, G2 are located on upper and lower sides of the first symmetry axis O1, respectively. Two of the four second holes 142 are arranged at opposite ends of each set of the two sets of holes G1, G2, respectively. Another eight third holes 143 are arranged as another two sets of holes G3, G4 respectively arranged along a straight line parallel to the second symmetry axis O2, and the another two sets of holes G3, G4 are symmetrical about the second symmetry axis O2. As shown in FIG. 3, two sets of holes G3, G4 are located on left and right sides of the second symmetry axis O2, respectively.

Continuing to refer to the embodiments of FIGS. 1-3, the partitions comprise a first partition 1451, a second partition 1452, and a third partition 1453. The first partition 1451 is configured to extend along the first symmetry axis O1 to connect between two first guards 1441 of the guard positioned along a pair of opposite sides of the square. The second partition 1452 and the third partition 1453 are respectively arranged into a shape of Chinese word "儿" (also referred to herein as "几-shaped") such that they are both arranged symmetrically about the first symmetry axis O1 so that openings of the shape of "几" face to each other. Each set of another two sets of holes G3, G4 are configured to have two third holes 143 respectively located in the opening of each of the shapes of two "几" and two third holes 143 respectively located outside the opening of each of the shapes of two "几", so that each of the third holes 143 located in the opening of each of the shapes of "儿" and each of the third holes 143 of the same and one set of holes located outside the opening of the shape of the "几" are arranged symmetrically about a horizontal line "-" comprising the top of the shape of the"几". Two first holes 141 of the four first holes 141 are respectively located out of two legs 14521, 14531 of the shape of one "几", and the other two first holes 141 of the four first holes 141 are respectively located out of the two legs of the shape of the other "几". Each of the four second guards 1442 is located radially outside a corresponding one of the first holes 141 at the four corners of the square and therefore located radially outside a corresponding one of the first terminals 110.

Figure 4:
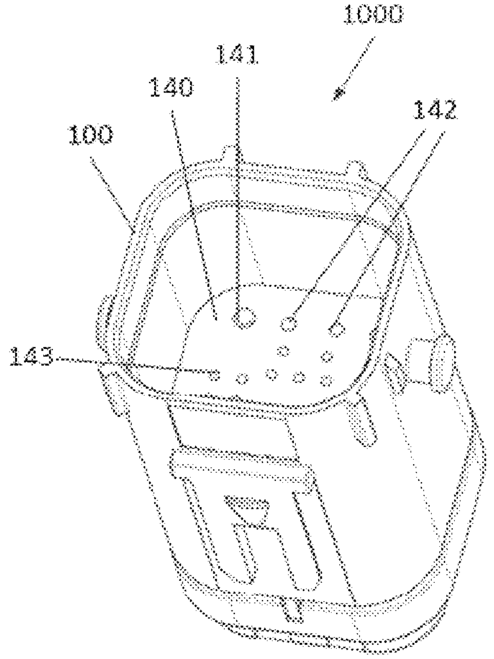
FIG. 4 is a perspective view of a connector according to another embodiment of the present disclosure.

Referring to the embodiment of FIGS. 4 to 6, this embodiment is identical to the embodiment of FIGS. 1 to 3, except for distributions of the second holes 142 and the third holes 143.

The four second holes 142 are respectively divided into two sets of second holes 142 aligned with and located between two of the four first holes 141 respectively. Sixteen third holes 143 are divided into four sets of third holes 143 located in four spaces (i.e., four quadrants) enclosed between the first symmetry axis O1 and the second symmetry axis O2, respectively. The two sets of the four sets of third holes 143 are symmetrical about the second symmetry axis O2 and form a shape of Chinese word "八" (also referred to herein as "八-shaped"), and the other two sets of the four sets of third holes 143 are symmetrical about the second symmetry axis O2 and form a shape of Chinese word "八". Another two third holes 143 are located on the second symmetry axis O2 and symmetrical about the first symmetry axis O1. One of the another two third holes 143 is aligned with the third one of the two sets of third holes 143 located towards the direction of the second symmetry axis O2 along the corresponding side facing away from the square. The other one of the another two third holes 143 is aligned with the third one of the other two sets of third holes 143 located towards the direction of the second symmetry axis O2 along the corresponding side facing away from the square. In this way, each quadrant contains one first hole 141, one second hole 142, and four third holes 143, and the distribution of holes in every two adjacent quadrants is symmetrical about the first symmetry axis O1 or the second symmetry axis O2.

Figure 7:
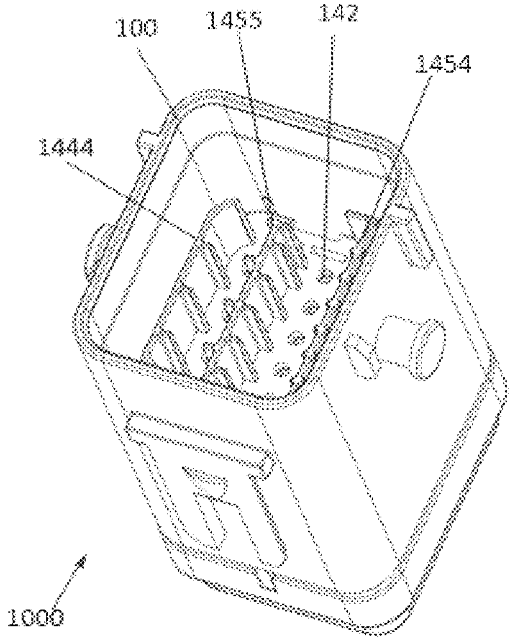
FIG. 7 is a perspective view of a connector according to another embodiment of the present disclosure.

Referring to the embodiment of FIGS. 7-9, the positioning plate 140 is configured as a rectangle, and four first holes 141 are aligned with each other in a direction parallel to a long side of the rectangle, six second holes 142 are aligned with each other in a direction parallel to a long side of the rectangle, sixteen third holes 143 are divided into two sets of third holes 143 aligned with each other in a direction parallel to a long side of the rectangle, and the four first holes 141, the six second holes 142 and each set of the two sets of third holes 143 are symmetrically distributed about a third symmetry axis O3 extending through the opposite long sides of the rectangle and are spaced from each other, respectively.

The embodiment of FIGS. 7-9 is provided with a third guard 1443 and a fourth guard 1444. The third guard 1443 is configured in a shape of sign "]" (referred to herein as "]-shaped") and located between the two sets of third holes 143 and one long side of the rectangle, so as to accommodate the two sets of third holes 143 in an opening of the shape of "]". The fourth guard 1444 is configured to extend along the other opposite long side of the rectangle between the four first holes 141 and the other opposite long side. The embodiment of FIGS. 7-9 is further provided with a fourth partition 1454 and a fifth partition 1455. The fourth partition 1454 is configured to extend between the two sets of third holes 143 and connected to two legs of the shape of "]". The fifth partition 1455 is configured to extend between the four first holes 141 and the six second holes 142.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector having a housing and provided with therein:

at least one first terminal adapted to transmit a first current;

at least one second terminal adapted to transmit a second current;

at least one third terminal adapted to transmit a signal, a total number of the at least one first terminal, the at least one second terminal, and the at least one third terminal is twenty-six; and a positioning plate mounted in the housing and coinciding with a cross section of the housing, the positioning plate includes at least one guard and at least one partition, the partition comprises a first partition, a second partition, and a third partition, the first partition extends along a first symmetry axis and is adapted to connect between two first guards of the at least one guard positioned along a pair of opposite sides of the positioning plate, the second and third partitions are each formed in a generally 几-shape and are arranged symmetrically about the first symmetry axis such that openings of the 几-shape second and third partitions face toward each other.

2. The connector according to claim 1, wherein the positioning plate includes:

at least one first hole through which the at least one first terminal is adapted to extend;

at least one second hole through which the at least one second terminal is adapted to extend; and at least one third hole through which the at least one third terminal is adapted to extend.

3. The connector according to claim 2, wherein the at least one guard protrudes from the positioning plate and extends in a circumferential direction of the positioning plate to surround the at least one first hole, the at least one second hole and the at least one third hole therein; and the at least one partition protrudes from the positioning plate and extends between at least two of the at least one first hole, the at least one second hole and the at least one third hole.

4. The connector according to claim 3, wherein the positioning plate is shaped as a square, and the at least one first hole, the at least one second hole, the at least one third hole, the at least one guard and the at least one partition are arranged such that they are symmetrically distributed about the first symmetry axis extending through one pair of two opposite sides of the square and a second symmetry axis extending through another pair of two opposite sides of the square, respectively.

5. The connector according to claim 4, wherein four of the first holes are arranged near respective ones of four corners of the square.

6. The connector according to claim 5, wherein ten third holes and four second holes are arranged as two sets of holes respectively arranged along a straight line parallel to the first symmetry axis, the two sets of holes are symmetrical about the first symmetry axis, and two of the four second holes are respectively arranged at opposite ends of each set of the two sets of holes respectively.

7. The connector according to claim 6, wherein another eight third holes are respectively arranged as another two sets of holes respectively arranged along a straight line parallel to the second symmetry axis, and the another two sets of holes are symmetrical about the second symmetry axis.

8. The connector according to claim 7, wherein each set of another two sets of holes are configured to have two third holes respectively located in the opening of each of the 几-shaped second and third partitions and two third holes respectively located outside the opening of each of 儿-shaped second and third partitions, so that each of the third holes located in the opening of each of the 几-shaped second and third partitions and each of the third holes of the same and one set of holes located outside the opening of the 几-shaped second and third partitions are arranged symmetrically about a horizontal line defining a portion of each of the 几-shaped second and third partitions, wherein, two of the four first holes are respectively located out of two legs of one of the 几-shaped second and third partitions, and the other two of the four first holes are respectively located out of the two legs of the other one of the 几-shaped second and third partitions.

9. The connector according to claim 6, wherein the four second holes are respectively divided into two sets of second holes aligned with and located between the at least two first holes.

10. The connector according to claim 9, wherein sixteen third holes are divided into four sets of third holes located in four spaces enclosed between the first and second symmetry axes, respectively, and two sets of the four sets of third holes are symmetrical about the second symmetry axis.

11. The connector according to claim 10, wherein the two sets of the four sets of third holes are arranged in a generally 八-shape, and the other two sets of the four sets of third holes are symmetrical about the second symmetry axis and are arranged in a 八-shape.

12. The connector according to claim 11, wherein another two third holes are located on the second symmetry axis and are symmetrical about the first symmetry axis, and one of the another two third holes is aligned with the third one of the two sets of third holes located towards the direction of the second symmetry axis along the corresponding side facing away from the square, the other one of the another two third holes is aligned with the third one of the other two sets of third holes located towards the direction of the second symmetry axis along the corresponding side facing away from the square.

13. The connector according to claim 3, wherein:

the positioning plate is rectangular;

four first holes are aligned with each other in a direction parallel to a long side of the rectangle;

six second holes are aligned with each other in a direction parallel to a long side of the rectangle;

sixteen third holes are divided into two sets of third holes aligned with each other in a direction parallel to a long side of the rectangle; and the four first holes, the six second holes and each set of the two sets of third holes are symmetrically distributed about a third symmetry axis extending through the opposite long sides of the rectangle and are spaced from each other, respectively.

14. The connector according to claim 13, wherein:

the at least one guard comprises:

a first guard formed in a generally ]-shape and located between the two sets of third holes and one long side of the rectangle, so as to accommodate the two sets of third holes in an opening of the ]-shape first guard; and a second guard extending along the other opposite long side of the rectangle between the four first holes and the other opposite long side; and the at least one partition comprises:

a fourth partition extending between the two sets of third holes and connected to two legs of the ]-shape first guard; and a fifth partition extending between the four first holes and the six second holes.

15. The connector according to claim 3, wherein at least one of the at least one guard and the at least one partition is provided with at least one protrusion projecting between two adjacent ones of the at least one first, second and third holes.

16. The connector according to claim 1, further comprising:

a mounting member disposed on an outside of the housing in a circumferential direction of the housing and adapted to mount the connector into a mounting plate; and a seal disposed on the mounting member and adapted to form a sealed connection between the connector and the mounting plate.

17. A connector, comprising:

a housing including therein:

a plurality of first terminals adapted to transmit a first current;

a plurality of second terminals adapted to transmit a second current; and a plurality of third terminals adapted to transmit a signal, a total number of the plurality of first, second and third terminal is at least twenty-six; and a positioning plate mounted in the housing and having:

a plurality of first holes through which the plurality of first terminals extend;

a plurality of second holes through which the plurality of second terminals extend;

a plurality of third holes through which the plurality of third terminals extend;

at least one guard protruding from the positioning plate and extending in a circumferential direction of the positioning plate to surround the plurality of first, second and third holes; and at least one partition protruding from the positioning plate and extending between at least two of the plurality of first holes, the plurality of second holes and the plurality of third holes, the partition comprises a first partition, a second partition, and a third partition, the first partition extends along a first symmetry axis and is adapted to connect between two first guards of the at least one guard positioned along a pair of opposite sides of the positioning plate, the second and third partitions are each formed in a generally 几-shape and are arranged symmetrically about the first symmetry axis such that openings of the 儿-shape second and third partitions face toward each other.

18. The connector according to claim 17, wherein:

the positioning plate is square-shaped; and the plurality of first, second and third holes, the at least one guard and the at least one partition are arranged such that they are symmetrically distributed about the first symmetry axis extending through one pair of two opposite sides of the square and a second symmetry axis extending through another pair of two opposite sides of the square, respectively.

19. The connector according to claim 18, wherein:

four first holes are arranged near respective ones of four corners of the square;

ten third holes and four second holes are arranged as two sets of holes respectively arranged along a straight line parallel to the first symmetry axis;

the two sets of holes are symmetrical about the first symmetry axis; and two of the four second holes are respectively arranged at opposite ends of each set of the two sets of holes respectively.

20. A connector having a housing and provided with therein:

a plurality of first terminals transmitting a first current;

a plurality of second terminals transmitting a second current;

a plurality of third terminals transmitting a signal, a total number of the first terminals, the second terminals, and the third terminals is twenty-six; and a positioning plate mounted in the housing and coinciding with a cross section of the housing, the positioning plate includes:

a plurality of first holes each of which one first terminal extends through;

a plurality of second holes each of which one second terminal extends through;

a plurality of third holes each of which one third terminal extends through;

a plurality of guards including a first guard and a second guard, the first guard is formed in a generally ]-shape and located between two sets of third holes and one long side of the positioning plate, so as to accommodate two sets of third holes in an opening of the ]-shape first guard, the second guard extends along an other opposite long side of the positioning plate between first holes and the other opposite long side; and a plurality of partitions including a fourth partition and a fifth partition, the fourth partition extends between the two sets of third holes and is connected to two legs of the ]-shape first guard, the fifth partition extends between the first holes and the second holes.

* * * * *